(12) United States Patent
Nakanishi et al.

(10) Patent No.: US 6,833,209 B2
(45) Date of Patent: Dec. 21, 2004

(54) FUEL-CELL CO-GENERATION SYSTEM, OF ELECTRICAL ENERGY AND HOT WATER

(75) Inventors: Osamu Nakanishi, Obu (JP); Kazuhiro Osada, Nagoya (JP); Takashi Ishikawa, Toyota (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 278 days.

(21) Appl. No.: 10/103,793

(22) Filed: Mar. 25, 2002

(65) Prior Publication Data

US 2002/0146605 A1 Oct. 10, 2002

(30) Foreign Application Priority Data

Mar. 23, 2001 (JP) ........................................ 2001-085721

(51) Int. Cl.[7] .............................................. H01M 8/04
(52) U.S. Cl. .......................................... 429/26; 429/34
(58) Field of Search ...................................... 429/26, 34

(56) References Cited

U.S. PATENT DOCUMENTS 6,284,398 B1    9/2001   Kiryu
6,331,366 B1 * 12/2001  Van Dine et al. ............. 429/17
2002/0146605 A1 * 10/2002 Nakanishi et al. ............. 429/22

FOREIGN PATENT DOCUMENTS

| DE | 10023578 | * 11/2001 | ............ H01M/8/02 |
| JP | 358023169 | * 2/1983 | ............ H01M/8/06 |
| JP | 11-97045 | 4/1999 | |
| JP | 2000-67897 | 3/2000 | |

\* cited by examiner

*Primary Examiner*—Mark Ruthkosky
(74) *Attorney, Agent, or Firm*—Oblon, Spivak, McClelland, Maier & Neustadt, P.C.

(57) ABSTRACT

A fuel-cell cogeneration system of electrical energy and hot water includes an off-gas burner for burning an off-gas from an anode electrode of a fuel cell, a reformer including a reformer burner for burning a mixture of air and fuel, a first heat exchanger provided at a downstream-side of stack cooling water, wherein the first heat exchanger is adapted to exchange heat from the off-gas burner with the stack cooling water from the fuel cell, to heat the stack cooling water, and a switch for switching a direction of flow of a reformed gas from the reformer, depending on an operation condition of the system and a demand for the hot water.

9 Claims, 7 Drawing Sheets

S100 : System Initiation
S101 : Shut valve 10 : Close
S102 : 1st outlet port 8a of 3-way valve 8 : Open
S103 : 2nd outlet port 9b of 3-way valve 9 : Open
S104 : Reforming : Start
S105 : 1st outlet port 9a of 3-way valve 9 : Open
S106 : Secondary Air Supply to Off-gas Burner 5 : Start
S107 : Power Generation : Is Ready ?
S116 : Steady Operation
S117 : Operation Mode Switching
S118 : Off-gas Supply to Burner 2
S119 : 1st outlet port 9a of 3-way valve 9 : Open
S120 : Hydrogen Utilization Rate ≧ Set value ?
S121 : Secondary Air Supply to Off-gas Burner 5 : Stop
S122 : Stack Cooling Water Temperature : Set Value
S123 : Off-gas Supply to Burner 2
S124 : 2nd outlet port 9b of 3-way valve 9 : Open

Fig. 3

S108 : Shut valve 10 : Open
S109 : 2nd outlet port 8b of 3-way valve 8 : Open
S110 : Operation Mode Switching
S111 : 1st outlet port 9a of 3-way valve 9 : Open
S112 : Secondary Air Supply to Off-gas Burner 5 : Start
S113 : Start Power generation & Output Increase
S114 : Hydrogen Utilization Rate ≥ Set value ?
S115 : Secondary Air Supply to Off-gas Burner 5 : Stop
S126 : Stack Cooling Water Temperature : Set Value
S127 : 2nd outlet port 9b of 3-way valve 9 : Open
S128 : Secondary Air Supply to Off-gas Burner 5 : Stop

FUEL-CELL CO-GENERATION SYSTEM, OF ELECTRICAL ENERGY AND HOT WATER

The present application is based on and claims priority under 35 U.S.C §119 with respect to Japanese Patent Application No. 2001-085721 on Mar. 23, 2001 (13th Year of Heisei), the entire content of which is incorporated herein by reference.

BACKGROUND OF THE INVENTION

1. Field of the Invention

The present invention is generally directed to a fuel-cell cogeneration system of electrical energy and hot water.

2. Description of the Related Art

Each of Japanese Patent Laid-open Print No. Hei-11 (1999)-97045 and Japanese Patent Laid-open Print No 2000-67897 discloses a fuel-cell cogeneration system of electrical energy and hot water. In the former, upon high demand for hot water, a reformer is brought into full operation and the resultant surplus hydrogen is stored in a tank. However, the tank is large in scale, thereby enlarging the overall size of the cogeneration system. In addition, the production cost thereof becomes higher.

In the latter, if operation of the fuel-cell stack is initiated while its temperature is low, a wet reformed gas enters the fuel-cell stack, which may close a gas passage in the fuel-cell stack due to a concentration of the water component of the reformed gas, resulting in performance degradation of the fuel-cell stack. To avoid such a problem, the reformed gas should be warmed by a heater before being introduced into the fuel-cell stack, for warming the fuel-cell stack accordingly. Such a structure makes the required time duration to initiate operation of the cogeneration system longer and is followed by energy loss.

Thus, a need exists to provide a fuel-cell cogeneration system of electrical energy and hot water, which is free from the aforementioned drawbacks.

SUMMARY OF THE INVENTION

In accordance with a first aspect of the present invention, a fuel-cell cogeneration system of electrical energy and hot water comprises an off gas burner for burning an off gas at an anode of a fuel-cell stack, a reformer including a reformer burner for burning a mixture of air and fuel; a first heat exchanger provided at a downstream-side of stack cooling water, wherein the first heat exchanger is adapted to exchange heat from the off-gas burner with the stack cooling water from the fuel cell, to heat the stack cooling water; and switching means for switching a direction of flow of a reformed gas from the reformer, depending on an operation condition of the system and a demand for the hot water.

In accordance with a second aspect of the present invention, a fuel-cell cogeneration system of electrical energy and hot water is a modification of the first aspect, wherein the switching means is a direction switching valve.

In accordance with a third aspect of the present invention, a fuel-cell cogeneration system of electrical energy and hot water is a modification of the first aspect, wherein the reformed gas is supplied to the off-gas burner for warming the stack cooling water at a warming-up stage of the system.

In accordance with a fourth aspect of the present invention, a fuel cell cogeneration system of electrical energy and hot water is a modification of the first aspect, wherein the reformed gas is supplied to the off-gas burner for warming the stack cooling water upon higher demand of hot water during a steady state operation of the system.

In accordance with a fifth aspect of the present invention, a fuel-cell cogeneration system of electrical energy and hot water is a modification of the first aspect, wherein the reformed gas is supplied to the reformer burner upon higher demand of electricity during a steady state operation of the system.

In accordance with a sixth aspect of the present invention, a fuel-cell cogeneration system of electrical energy and hot water is a modification of the second aspect, wherein the direction switching valve is a first 3-directional switching valve which controls fluid communication between each of the reformer, the reformer burner and the gas burner.

In accordance with a seventh aspect of the present invention, fuel-cell cogeneration system of electrical energy and hot water is a modification of the sixth aspect, which further comprises a second heat exchanger provided between the reformer and the fuel-cell stack and a second three-way valve which controls a fluid communication between the second heat exchanger and the fuel-cell stack.

In accordance with an eighth aspect of the present invention, fuel-cell cogeneration system of electrical energy and hot water is a modification of the seventh aspect, which further comprises a third heat exchanger provided between the first heat exchanger and the second heat exchanger, the third heat exchanger being adapted to receive the heated stack cooling water and to heat exchange the stack cooling water with a secondary cooling water.

In accordance with a ninth aspect of the present invention, fuel-cell cogeneration system of electrical energy and hot w fuel-cell cogeneration system of electrical energy and hot water, comprises off-gas burner means for burning an off-gas from an anode electrode of a fuel cell; reformer means including a reformer burner for burning a mixture of air and fuel; first heat exchanger means for exchanging heat from the off-gas burner means with the stack cooling water from the fuel cell; and switching means for switching a direction of flow of a reformed gas from the reformer means, depending on an operation condition of the system and a demand for the hot water.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PREFERRED EMBODIMENT

Hereinafter, an embodiment of the present invention will be described in great detail with reference to the attached drawings.

Figure 1:
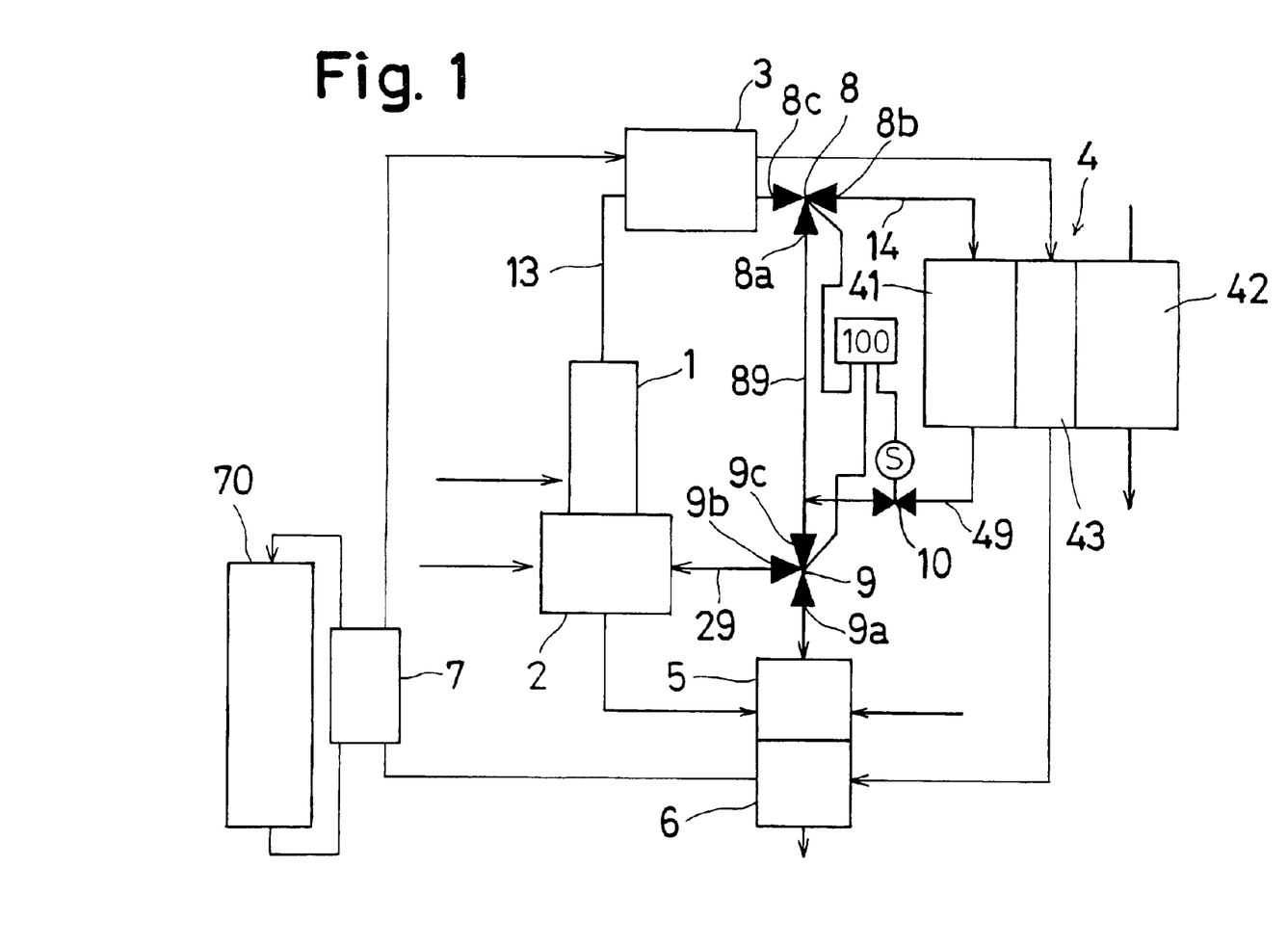
FIG. 1 is a diagram of a fuel-cell cogeneration system according to the present invention.

Referring first to FIG. 1, there is illustrated an overall structure of a fuel-cell cogeneration system which includes a reformer burner 2 for burning a mixture of air and fuel, and a reforming portion 1. The reforming portion 1 reforms, by utilizing a produced energy of the reformer burner 2, a mixture of raw material of reforming and steam to produce a reformed gas. The reformer burner 2 and the reforming portion cooperate to constitute a reformer.

The fuel-cell cogeneration system also includes a fuel-cell stack 4 having an anode 41, a cathode 42, and a cooling device 43. The anode 41 is connected with the reforming portion 1, for being supplied with the reformed gas, by way of a passage 13, a heat exchanger 3, an inlet port 8c of a first three-way valve 8, a second outlet 8b thereof and a passage 14. The reformed gas, after passing through the anode 41 of the fuel-cell stack 4, is fed by way of a passage 49 and a shut-off valve 10 to an inlet port 9c of a second three-way valve 9. The inlet port 9c of the second three-way valve 9 is also connected with a first outlet port 8a of the first three-way valve 8 by way of a passage 89. A first outlet port 9a and a second outlet port 9b of the second three-way valve 9 are connected to an off-gas burner 5 and the reformer burner 2, respectively.

The first three-way valve 8, the shut-off valve 10, and the second three-way valve 9 are under the control of a microprocessor-based controller 100. The controller 100 determines, as will be detailed later, one or more portions to which the reformed gas should be supplied depending on both operating condition of the system and a demand for hot water.

In the off gas burner 5, an off-gas at the reformer burner 2, an off-gas at the anode 41, and secondary air are burned. The resulting exhaust gas passes through a first passage of a heat exchanger 6 placed next to the off-gas burner 5.

A second passage of the heat exchanger 3, the cooling passage 43 of the fuel-cell stack 4, a second passage of the heat exchanger 6, and a second passage of a heat exchanger 7 constitute a cooling circuit through which an volume of stack cooling water is circulated. In the heat exchanger 7, water passing though its first passage (the cooling circuit) is brought into heat exchange with the water passing through its second passage, which is at a higher temperature and is stored as a hot water in a tank 70.

The stack cooling water, after passing through the cooling device 43, is heat-exchanged at the heat exchanger 6 at the downstream side of the stack cooling water, with the off-gas exhaust gas of the off gas burner 6. The resulting heated stack cooling water heats the water in the second passage of the heat exchanger 7, as the heated stack cooling water passes through the first passage of the heat exchanger 7, resulting in hot secondary cooling water storage in the tank 7 as mentioned above.

When the stack cooling water passes through the second passage of the heat exchanger 3, the stack cooling water cools the reformed gas whose temperature is about 120–170° C. down to a lower temperature in order to protect the three-way valve 8 from possible heat damage. The resulting heat exchange also lowers the stack cooling water temperature to 70–80° C., which makes it possible to protect a membrane (not shown) in the fuel-cell stack 4, due to the fact that any gas introduced into the fuel-cell stack should be less than 100° C. in temperature from the viewpoint of protecting the membrane.

The off-gas burner 5 is in the form of a catalyst burner which is wide in burning range in light of the fact that the composition of the off gas at the anode varies largely depending on the fuel-cell stack operation conditions.

Oxygen is used for increasing the susceptibility of substances in the off-gas burner 5. Oxygen remained in the exhaust gas of the reformer burner 2 may be used. If the amount of the off-gas to be burnt is too large, the secondary air is introduced into the off-gas burner 5. Such introduction of secondary air makes it possible to increase the temperature during burning to make the temperature difference between the burning and the stack cooling water much wider, thereby establishing more effective heat exchange in the heat exchanger 6. Thus, it is possible to more effectively recover the heat of the exhaust gas.

The stack cooling water is warmed by an exhaust heat from the fuel-cell stack 4 and the burning heat of the gas burner 5. If the temperature of the stack cooling water reaches a set value (73° C.), the secondary cooling water is controlled by the heat exchanger 7 to limit the temperature of the stack cooling water into a set temperature range (73–76° C.). The secondary cooling water is warmed up from room temperature (or the temperature of the secondary cooling water upon system initiation) to 65° C., and thereafter is stored in the tank 7 for being available at any time.

The reformed gas is in the form of an H-enriched fuel gas resulting from burning the mixture of the raw material of reforming and steam in the burner 2. The flow of such a fuel gas, after being heat exchanged with the stack cooling water in the heat exchanger 3, varies according to operation modes: start-up operation mode, warming-up operation mode, hot-water supply oriented power generation mode, and electricity supply oriented power generation mode.

Upon start-up operation mode, the controller 100 allows the first outlet port 8a of the first three-way valve 8 and the second outlet port 9b of the second three-way valve to open for burning all of the reformed gas (i.e., H-enriched fuel gas) in the reformer burner 2. This burning is called gas-phase combustion. This combustion is made due to the fact that when a large amount of unreformed gas such as methane is contained in the reformed gas, power generation is difficult.

If the proportion of the unreformed gas in the reformed gas becomes smaller and smaller, a warming-up operation is performed until the reformed gas composition becomes stable. In this warming-up operation, the controller 100 allows the first outlet port 8a of the first three-way valve 8 and the first outlet port 9a of the second three-way valve 9 to open, which causes the reformed gas to burn in the off-gas burner 5 for fully warming the stack cooling water to a temperature at which the fuel-cell stack is allowed to operate. Then, the shut-off valve 10 is opened to initiate power generation. Depending on whether the hot water supply oriented power generation mode or the electricity supply oriented power generation mode is selected, the first outlet port 9a or the second outlet port 9b of the second three-way valve 9, respectively, is opened. It is to be noted that even in the selection of the electricity supply oriented power generation mode, if the temperature of the stack cooling water is decreased below the set value, the operation is shifted or switched to the hot water supply oriented power generation mode in order to avoid a malfunction of the system resulting from an excessively low temperature of the fuel-cell stack 4.

Figure 2:
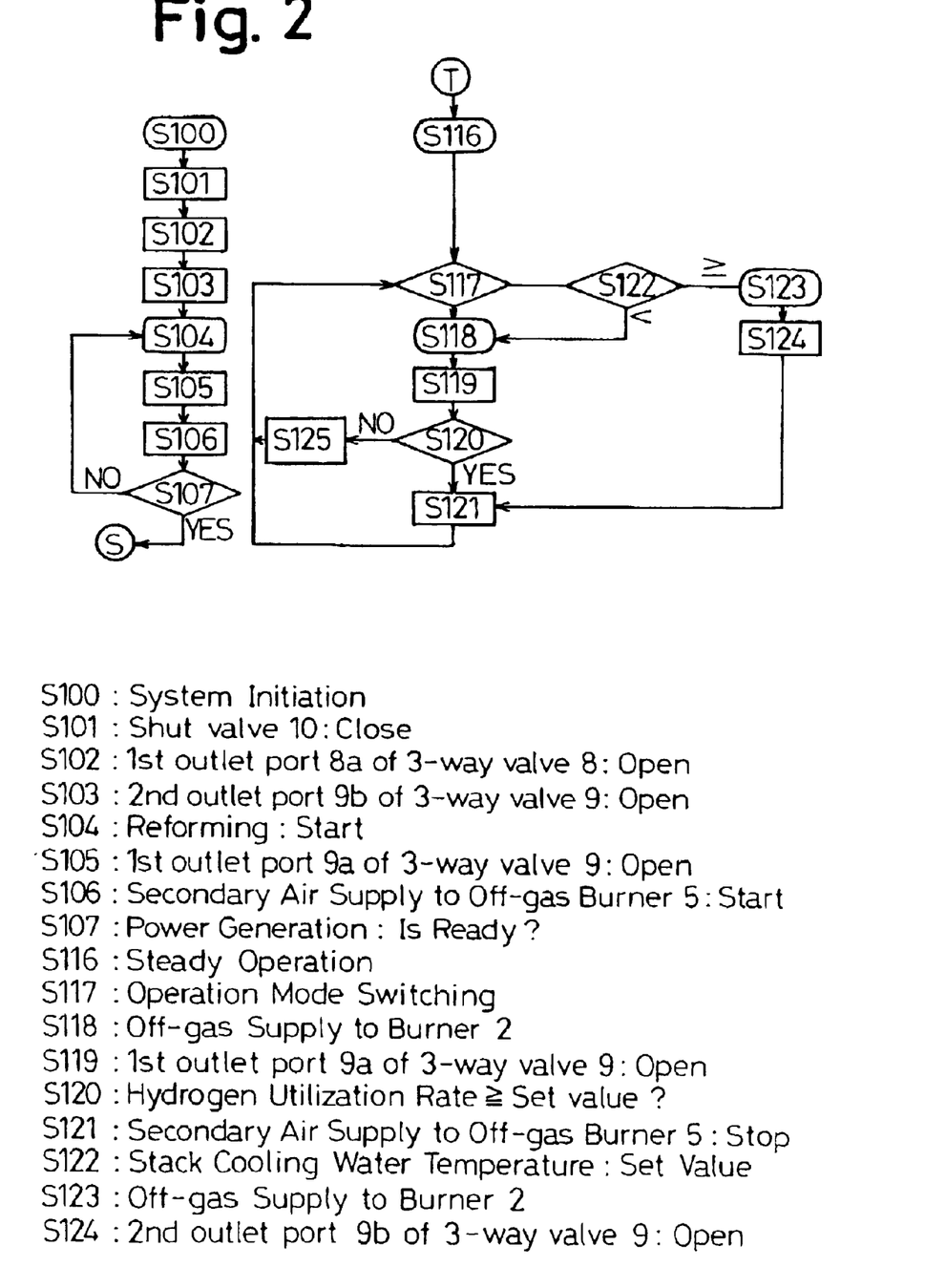
FIG. 2 and FIG. 3 in combination show a flowchart for indicating a control of the system shown in FIG. 1.
Figure 3:
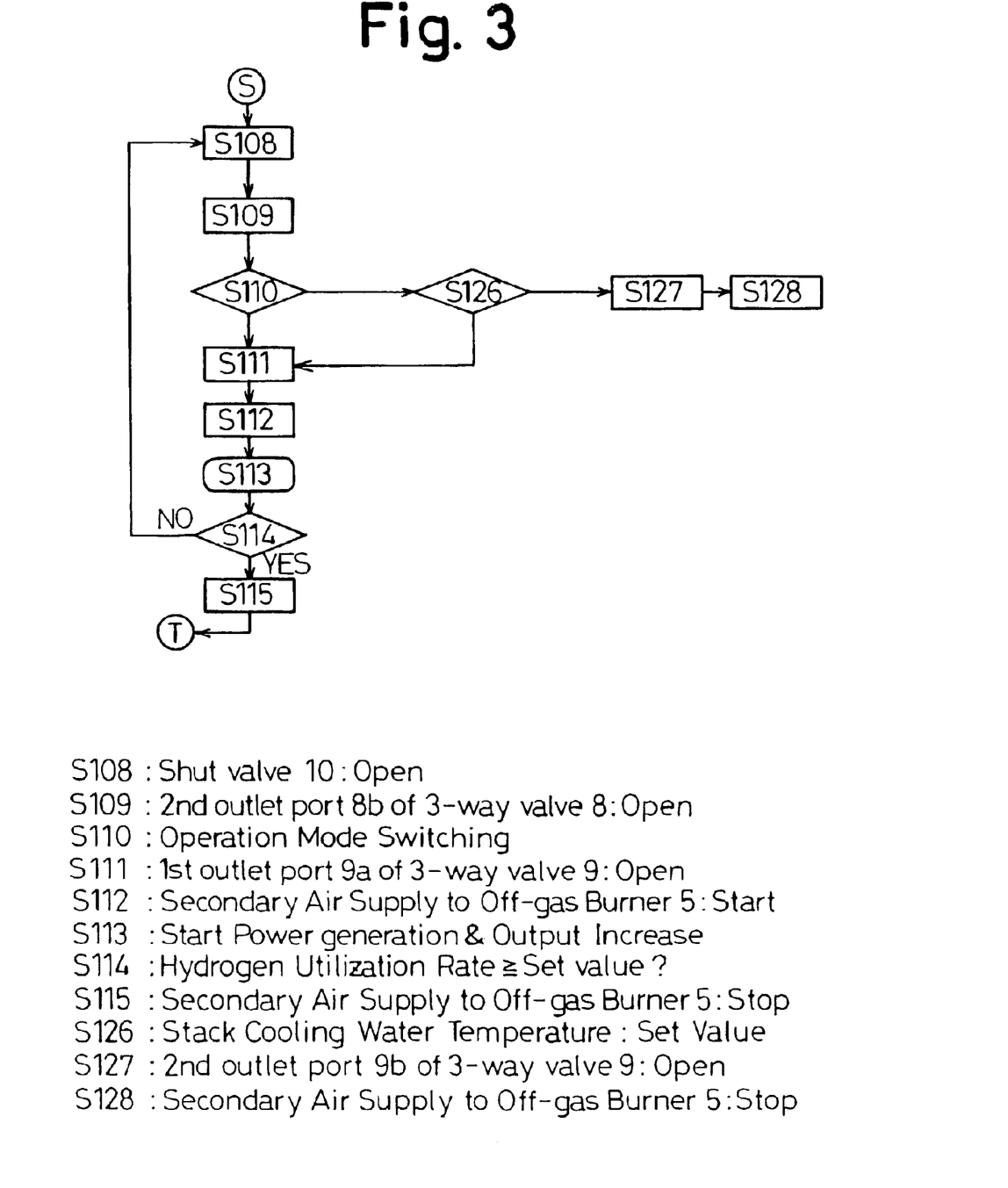

The detailed operation of the fuel-cell cogeneration system according to the present embodiment can be understood from a flowchart illustrated in FIGS. 2 and 3.

When the fuel-cell cogeneration system having the above-described structure was operated according to the following conditions, recovered heat amounts and start-up time were measured.

Test conditions:

Temperature when the above cogeneration system was initiated 60° C.

Set temperature of the stack cooling water: 73° C.

During hot water supply oriented power generation mode, the first outlet port 9a of the second three-way valve 9 is first opened. Then, if the hydrogen utilization rate is found to be less than a set value, the remained air in the exhaust gas from the reformer burner 2 is insufficient, which requires a supply of the secondary air to the off-gas burner 5. During the electricity supply oriented mode, if the temperature of the stack cooling water is less than the set value, the operation is performed according to the hot water supply oriented mode. Then, as soon as the stack cooling water is equal to or greater than the set value, the operation is performed according to the electricity supply oriented mode, and the second outlet port 9b of the second three-way valve 9 is closed and the supply of the secondary air to the off-gas burner 5 is terminated.

Figure 4:
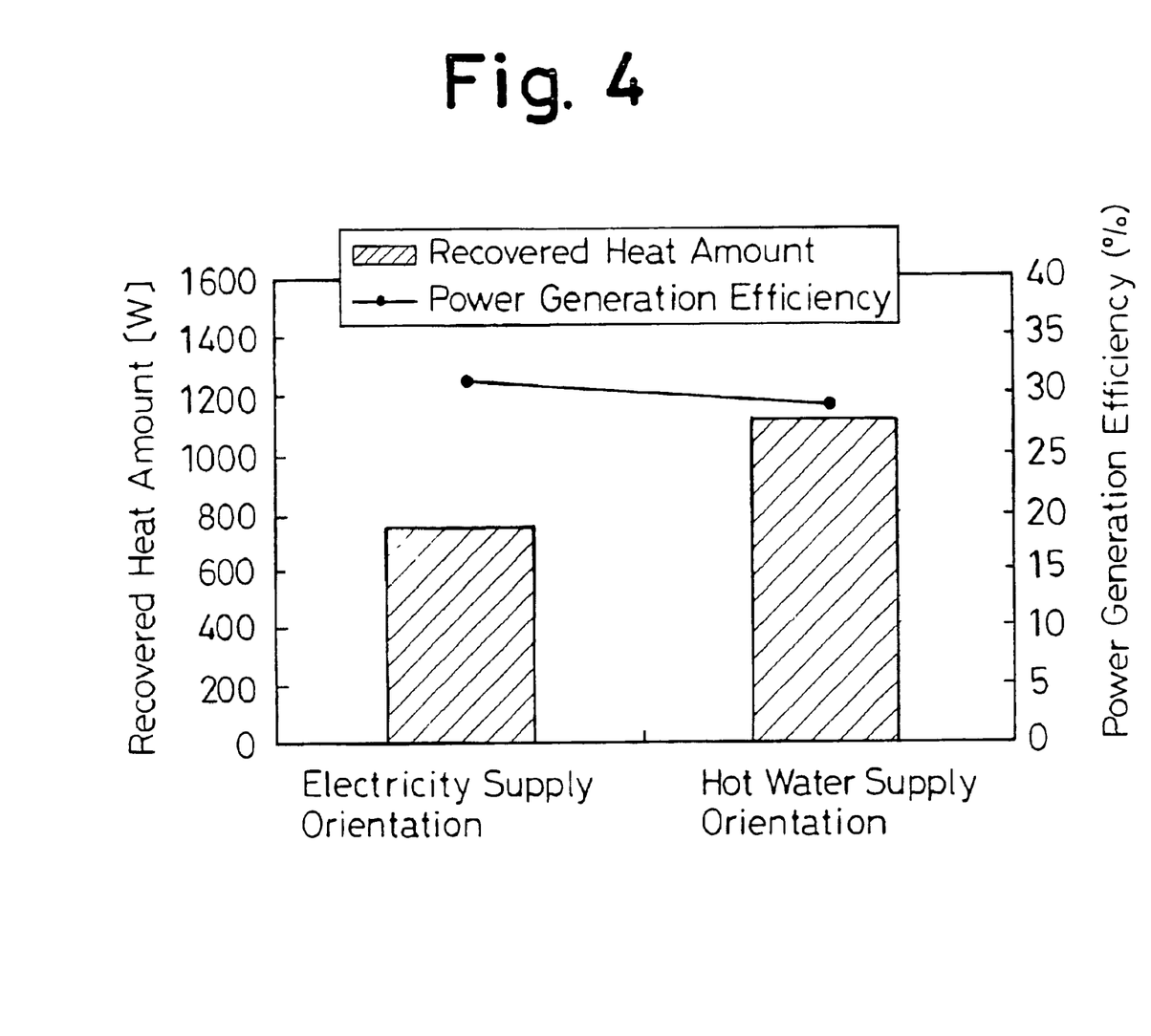
FIG. 4 is a graph representing recovered heat amount and power generation efficiency in the cogeneration system shown in FIG. 1.
Figure 5:
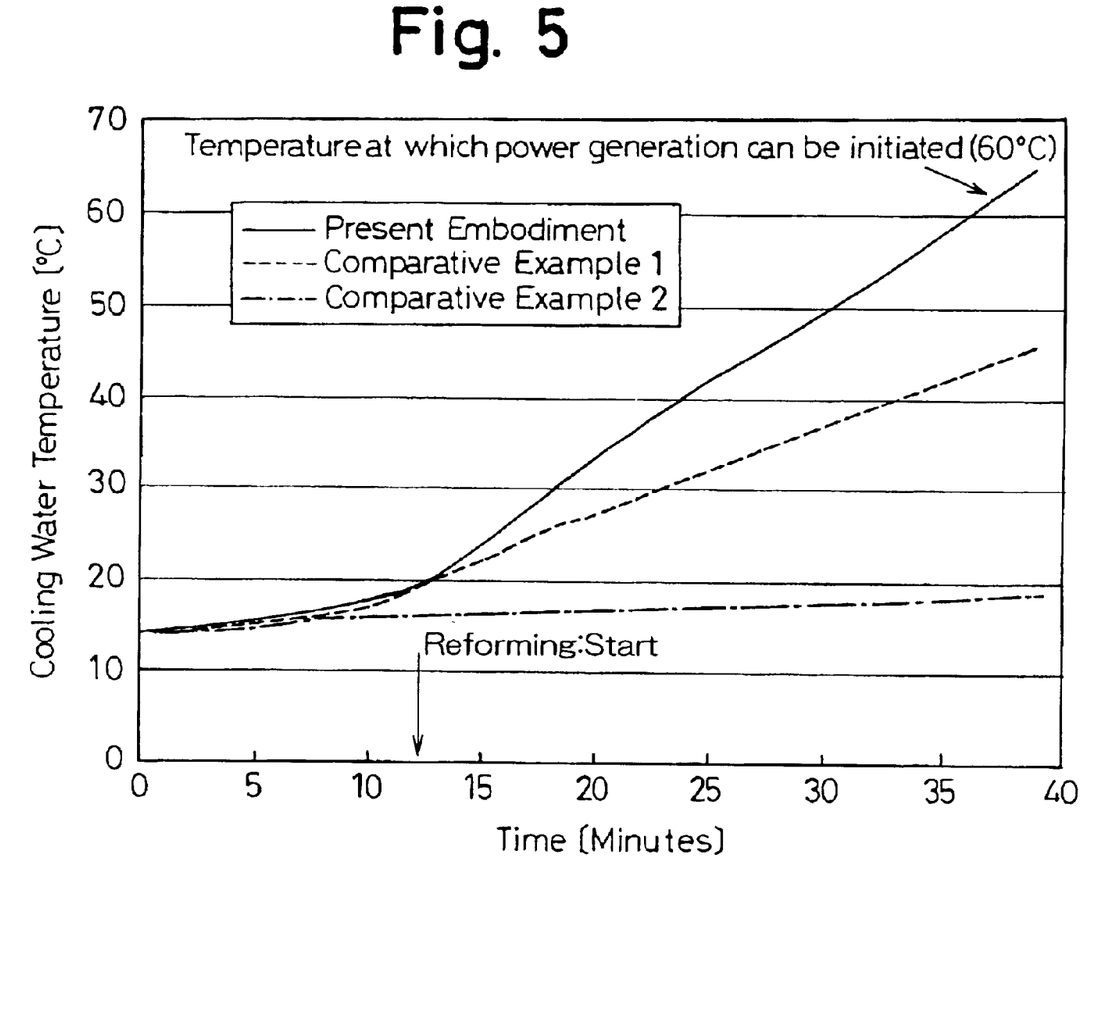
FIG. 5 is a graph representing a stack cooling water temperature change with passing of time for each of an embodiment of the present invention and comparative examples 1 and 2.
Figure 6:
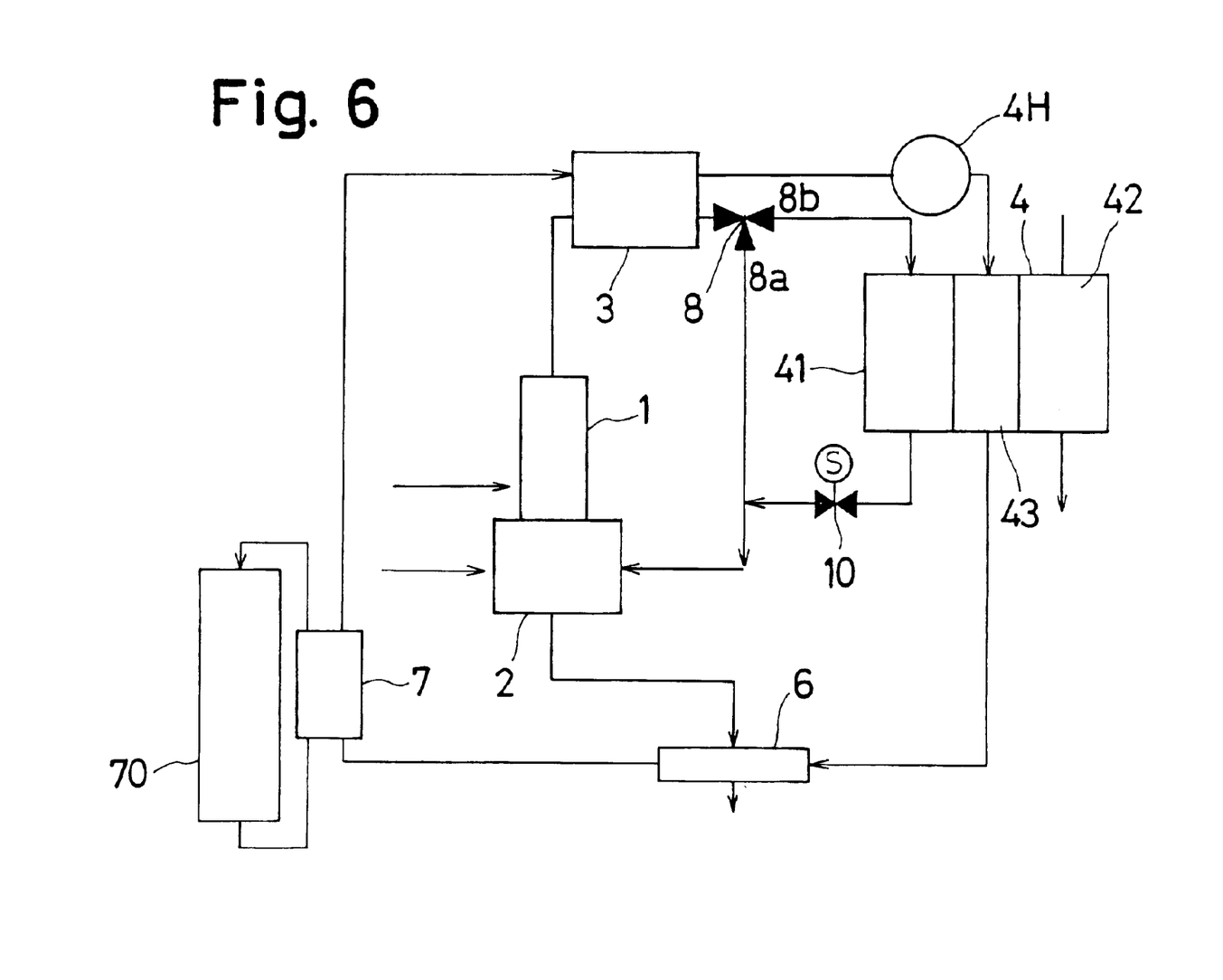
FIG. 6 is a diagram of a fuel-cell cogeneration system according to the comparative example.
Figure 7:
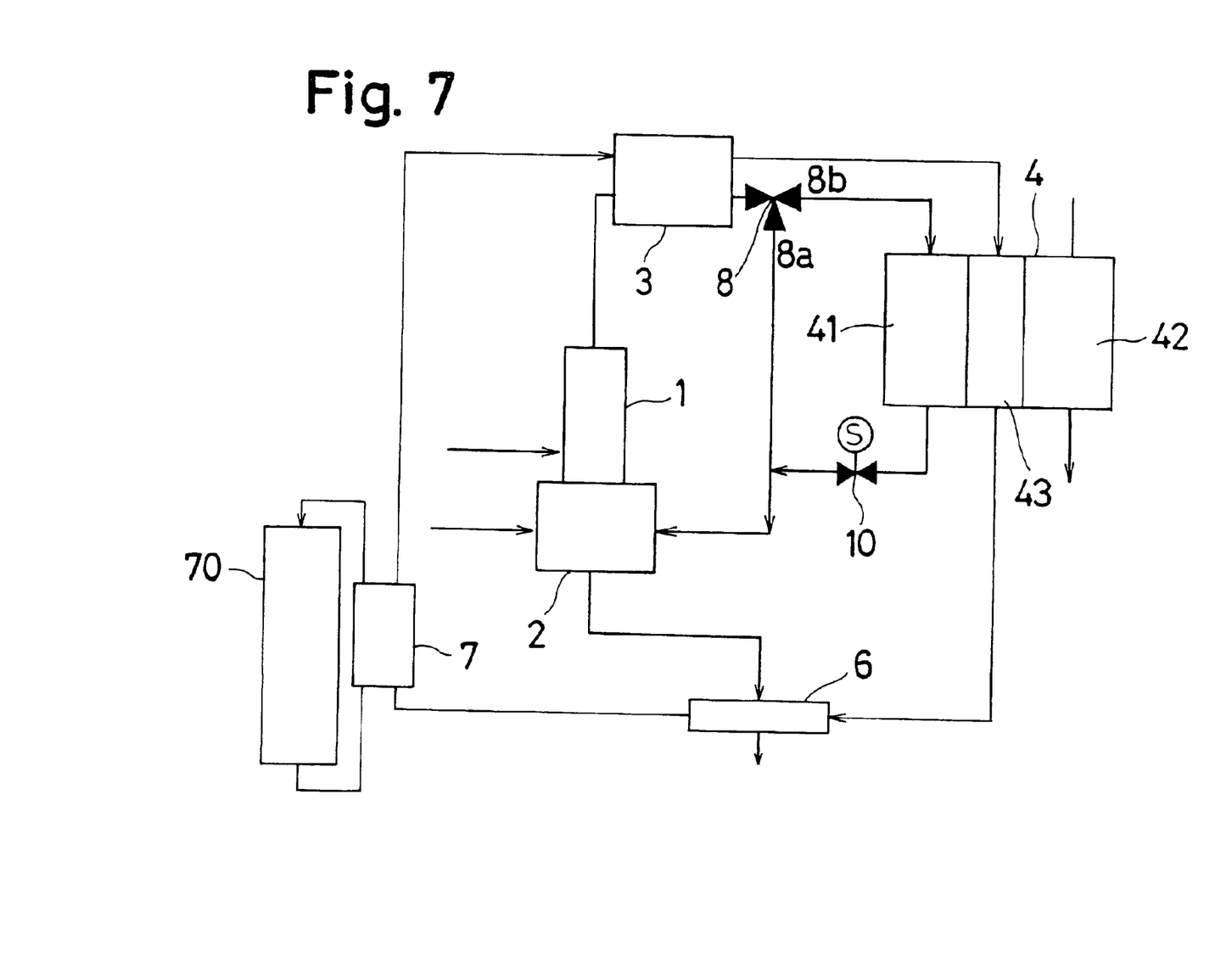
FIG. 7 is a diagram of a fuel-cell cogeneration system according to the comparative example 2.

The recovered heat amounts are shown in FIG. 4. The start-up time is plotted in a graph in FIG. 5, and those of comparative examples 1 and 2 whose structure are shown in FIGS. 6 and 7, respectively, are also plotted. It is to be noted that in the above comparison, the means for warming the stack cooling water in each system is as follows:

In the present embodiment: off gas burning (equivalent to 500 W electric power generation).

In the comparative example 1: 1 kw heater 4H.

In the comparative example 2: exhaust gas of reformer only.

In summary, the fuel-cell cogeneration system of electrical energy and hot water can provide the following advantages. Upon initiation of the system, it enables the warming-up time to be much shorter, by warming the stack cooling water using off-gas burning heat.

During steady operation of the system, to cope with a high demand for hot water, recovering hot water by heat-exchanging of the water with the warmed stack cooling water resulting from the off-gas burning heat.

During steady operation of the system, to cope with high electricity supply demand, returning the off-gas to the reformer burner 2 to increase the power generation efficiency, while the hot water recovery is established such that the stack cooling water is heat-exchanged only at the fuel-cell stack 4 and the burner 2.

The invention has thus been shown and description with reference to specific embodiments, however, it should be understood that the invention is in no way limited to the details of the illustrated structures, but changes and modifications may be made without departing from the scope of the appended claims.

What is claimed is:

1. A fuel-cell cogeneration system of electrical energy and hot water, comprising:
   an off-gas burner for burning an off-gas from an anode electrode of a fuel cell;
   a reformer including a reformer burner for burning a mixture of air and fuel;
   a first heat exchanger provided at a downstream-side of stack cooling water, wherein the first heat exchanger is adapted to exchange heat from the off-gas burner with the stack cooling water from the fuel cell, to heat the stack cooling water; and
   switching means for switching a direction of flow of a reformed gas from the reformer, depending on an operation condition of the system and a demand for the hot water.

2. A fuel-cell cogeneration system of electrical energy and hot water in accordance with claim 1, wherein the switching means is a direction switching valve.

3. A fuel-cell cogeneration system of electrical energy and hot water in accordance with claim 1, further comprising means for supplying the reformed gas to the off gas burner for warming the stack cooling water at a warming-up stage of the system.

4. A fuel-cell cogeneration system of electrical energy and hot water in accordance with claim 1, further comprising means for supplying the reformed gas to the off-gas burner for warming the stack cooling water during a steady state operation of the system.

5. A fuel-cell cogeneration system of electrical energy and hot water in accordance with claim 1, further comprising means for supplying the reformed gas to the reformer burner during a steady state operation of the system.

6. A fuel-cell cogeneration system of electrical energy and hot water in accordance with claim 2, wherein the direction switching valve is a first three-way valve positioned to control fluid communication between each of the reformer, the reformer burner, and the off gas burner.

7. A fuel-cell cogeneration system of electrical energy and hot water in accordance with claim 6, further comprising a second heat exchanger provided between the reformer and the fuel-cell stack, and a second three-way valve positioned to control fluid communication between the second heat exchanger and the fuel-cell stack.

8. A fuel-cell cogeneration system of electrical energy and hot water in accordance with claim 7, further comprising a third heat exchanger provided between the first heat exchanger and the second heat exchanger, the third heat exchanger being adapted to receive the heated stack cooling water and to heat exchange the stack cooling water with a secondary cooling water.

9. A fuel-cell cogeneration system of electrical energy and hot water, comprising:
   off-gas burner means for burning an off-gas from an anode electrode of a fuel cell;
   reformer means including a reformer burner for burning a mixture of air and fuel;
   first heat exchanger means for exchanging heat from the off-gas burner means with the stack cooling water from the fuel cell; and
   switching means for switching a direction of flow of a reformed gas from the reformer means, depending on an operation condition of the system and a demand for the hot water.

* * * * *